(12) United States Patent
Kyhl

(10) Patent No.: US 10,473,828 B2
(45) Date of Patent: Nov. 12, 2019

(54) BEAM DUMPS HAVING TAILORED ABSORBING SURFACES

(71) Applicant: Raytheon Company, Waltham, MA (US)

(72) Inventor: Curtis Kyhl, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/953,199

(22) Filed: Apr. 13, 2018

(65) Prior Publication Data

US 2019/0317252 A1 Oct. 17, 2019

(51) Int. Cl.
*G02B 5/00* (2006.01)

(52) U.S. Cl.
CPC ................... *G02B 5/003* (2013.01)

(58) Field of Classification Search
CPC . G02B 5/00; G02B 5/001; G02B 5/02; G02B 5/003; B23K 26/06; B23K 26/704; B23K 26/0626
See application file for complete search history.

(56) References Cited

U.S. PATENT DOCUMENTS

| | | | |
|---|---|---|---|
| 4,864,098 A | 9/1989 | Basanese et al. | |
| 5,225,933 A | 7/1993 | Myers et al. | |
| 6,677,588 B1 * | 1/2004 | Granneman | G01J 3/0262 250/338.1 |
| 6,792,017 B2 | 9/2004 | Halpin | |
| 7,374,298 B2 | 5/2008 | Gregoire | |
| 8,047,663 B2 | 11/2011 | Pang et al. | |
| 9,742,142 B1 | 8/2017 | Koontz et al. | |
| 2003/0210465 A1 | 11/2003 | Valenti | |
| 2008/0089382 A1 | 4/2008 | Eigler et al. | |
| 2012/0001061 A1 | 1/2012 | Zillmer | |
| 2013/0248739 A1 * | 9/2013 | Weber | B23K 26/12 250/517.1 |

(Continued)

FOREIGN PATENT DOCUMENTS

| | | |
|---|---|---|
| GB | 2436871 A | 10/2007 |
| WO | 2014063947 A1 | 5/2014 |

OTHER PUBLICATIONS

Duocastella et al., "Bessel and annular beams for materials processing", Laser Photonics Review 6, No. 5, Sep. 2012, 15 pages.

(Continued)

*Primary Examiner* — Sultan Chowdhury

(57) ABSTRACT

An apparatus includes a housing defining a cavity configured to receive laser energy and an absorbing surface within the cavity configured to absorb and convert the laser energy into thermal energy. A shape of the absorbing surface is based on a profile of the laser energy. At least one first portion of the absorbing surface has one or more first angles of incidence with respect to the laser energy and is configured to receive at least one first portion of the laser energy. At least one second portion of the absorbing surface has one or more second angles of incidence with respect to the laser energy and is configured to receive at least one second portion of the laser energy. The first angle(s) is/are larger than the second angle(s). The first portion(s) of the laser energy is/are more intense than the second portion(s) of the laser energy.

20 Claims, 11 Drawing Sheets

(56) References Cited

U.S. PATENT DOCUMENTS

2014/0029103 A1 1/2014 Budleski
2017/0299857 A1* 10/2017 Kurosawa ............ G02B 26/023

OTHER PUBLICATIONS

Kennedy et al., "Creation of Laguerre-Gaussian laser modes using diffractive optics", Physical Review A 66, Oct. 2002, 5 pages.
Wang et al., "Generalised Hermite-Gaussian beams and mode transformations", Journal of Optics, vol. 18, No. 5, Mar. 2016, 10 pages.

\* cited by examiner

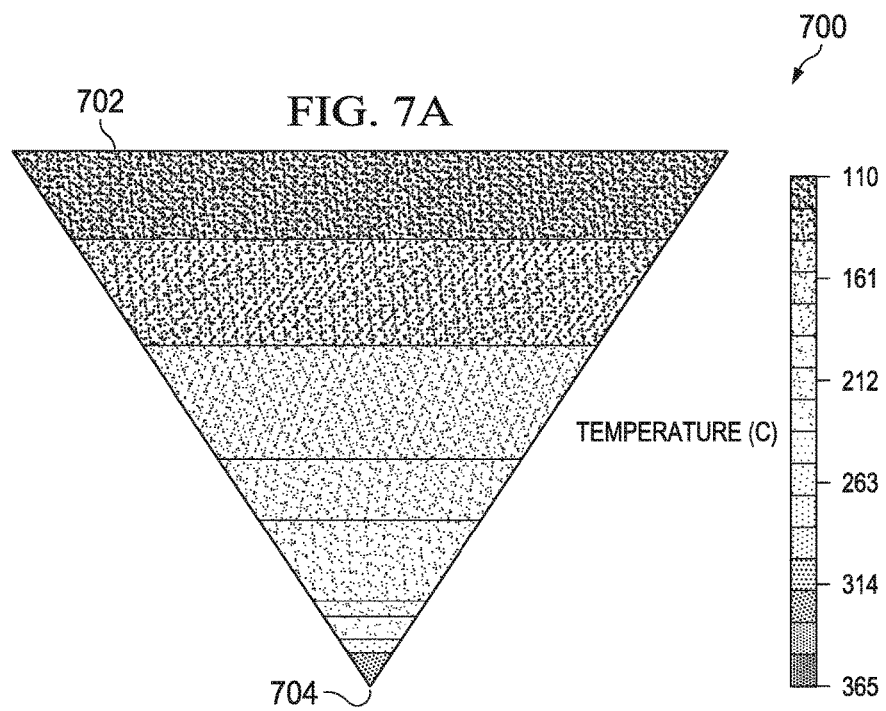
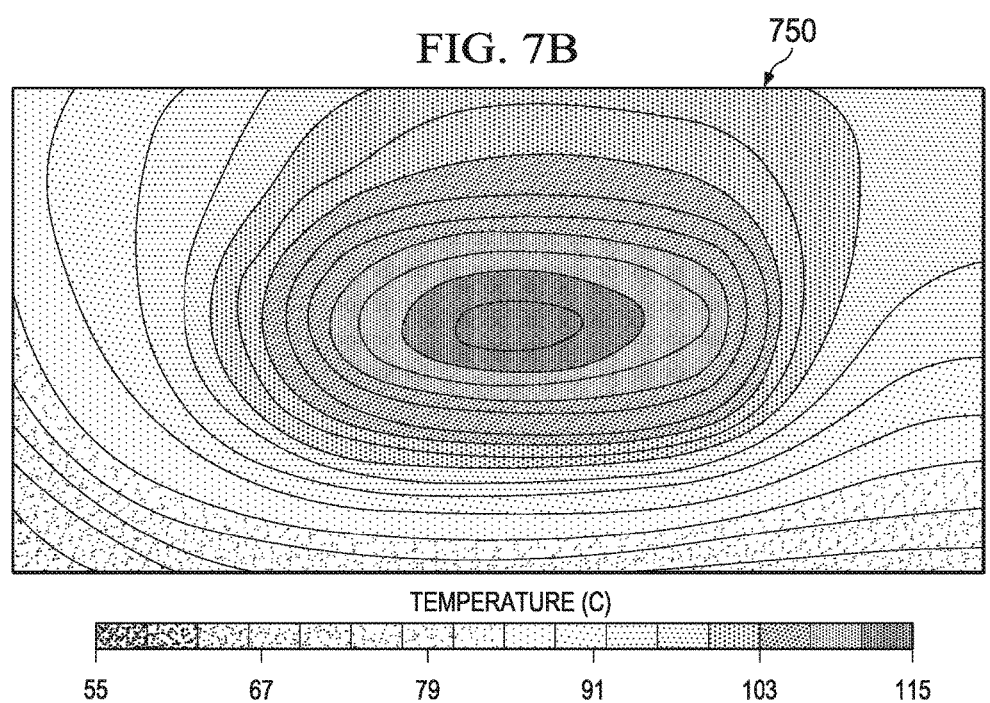

BEAM DUMPS HAVING TAILORED ABSORBING SURFACES

TECHNICAL FIELD

This disclosure is generally directed to laser systems. More specifically, this disclosure is directed to beam dumps having tailored absorbing surfaces.

BACKGROUND

Conventional laser systems often include beam dumps, which are devices configured to receive laser energy and to convert the laser energy into thermal energy. The thermal energy can then be removed from the beam dumps, such as by using cooling fluid (liquid or air) flowing through the beam dumps. The beam dumps therefore help to capture and remove laser energy from the laser systems. Beam dumps may be useful in various situations, such as when a residual laser beam is diverted to a beam dump during system shutdown or when laser energy needs to be captured so that it does not damage sensitive components of a laser system.

SUMMARY

This disclosure provides beam dumps having tailored absorbing surfaces.

In a first embodiment, an apparatus includes a housing that defines a cavity configured to receive laser energy and an absorbing surface within the cavity. The absorbing surface is configured to absorb the laser energy and convert the laser energy into thermal energy. A shape of the absorbing surface is based on a profile of the laser energy such that (i) at least one first portion of the absorbing surface has one or more first angles of incidence with respect to the laser energy and is configured to receive at least one first portion of the laser energy and (ii) at least one second portion of the absorbing surface has one or more second angles of incidence with respect to the laser energy and is configured to receive at least one second portion of the laser energy. The one or more first angles of incidence are larger than the one or more second angles of incidence. The at least one first portion of the laser energy is more intense than the at least one second portion of the laser energy.

In a second embodiment, an apparatus includes a housing that defines a cavity configured to receive laser energy and an absorbing surface within the cavity. The absorbing surface is configured to absorb the laser energy and convert the laser energy into thermal energy. A first portion of the absorbing surface has one or more first angles of incidence with respect to the laser energy and is configured to receive at least one first portion of the laser energy. Second and third portions of the absorbing surface respectively have one or more second angles of incidence and one or more third angles of incidence with respect to the laser energy and are configured to respectively receive at least one second portion of the laser energy and at least one third portion of the laser energy. The first, second, and third portions of the absorbing surface are arranged linearly such that the first portion of the absorbing surface is located between the second and third portions of the absorbing surface. The one or more first angles of incidence are larger than the one or more second angles of incidence and the one or more third angles of incidence. The at least one first portion of the laser energy is more intense than the second and third portions of the laser energy.

In a third embodiment, an apparatus includes a housing that defines a cavity configured to receive laser energy and an absorbing surface within the cavity. The absorbing surface is configured to absorb the laser energy and convert the laser energy into thermal energy. A shape of the absorbing surface includes an exponential cone. A first portion of the absorbing surface includes a tip of the exponential cone, and the first portion has one or more first angles of incidence with respect to the laser energy and being configured to receive a first portion of the laser energy. A second portion of the absorbing surface includes a base of the exponential cone, and the second portion has one or more second angles of incidence with respect to the laser energy and being configured to receive a second portion of the laser energy. The one or more first angles of incidence are larger than the one or more second angles of incidence. The first portion of the laser energy is more intense than the second portion of the laser energy.

In a fourth embodiment, an apparatus includes a housing that defines a cavity configured to receive laser energy and an absorbing surface within the cavity. The absorbing surface is configured to absorb the laser energy and convert the laser energy into thermal energy. A shape of the absorbing surface includes a truncated exponential cone. A first portion of the absorbing surface includes a central portion of the truncated exponential cone. A second portion of the absorbing surface includes a base of the truncated exponential cone. A third portion of the absorbing surface includes a surface between the central portion of the truncated exponential cone and the base of the truncated exponential cone. The first and second portions of the absorbing surface respectively have one or more first angles of incidence and one or more second angles of incidence with respect to the laser energy and are configured to respectively receive at least one first portion of the laser energy and at least one second portion of the laser energy. The third portion of the absorbing surface has one or more third angles of incidence with respect to the laser energy and is configured to receive at least one third portion of the laser energy. The one or more third angles of incidence are larger than the one or more first angles of incidence and the one or more second angles of incidence. The at least one third portion of the laser energy is more intense than the first and second portions of the laser energy.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 7A and 7B illustrate example results that could be obtained using a beam dump having an absorbing surface tailored to a beam profile for a high-energy laser system or other system according to this disclosure;

DETAILED DESCRIPTION

Figure 1A:
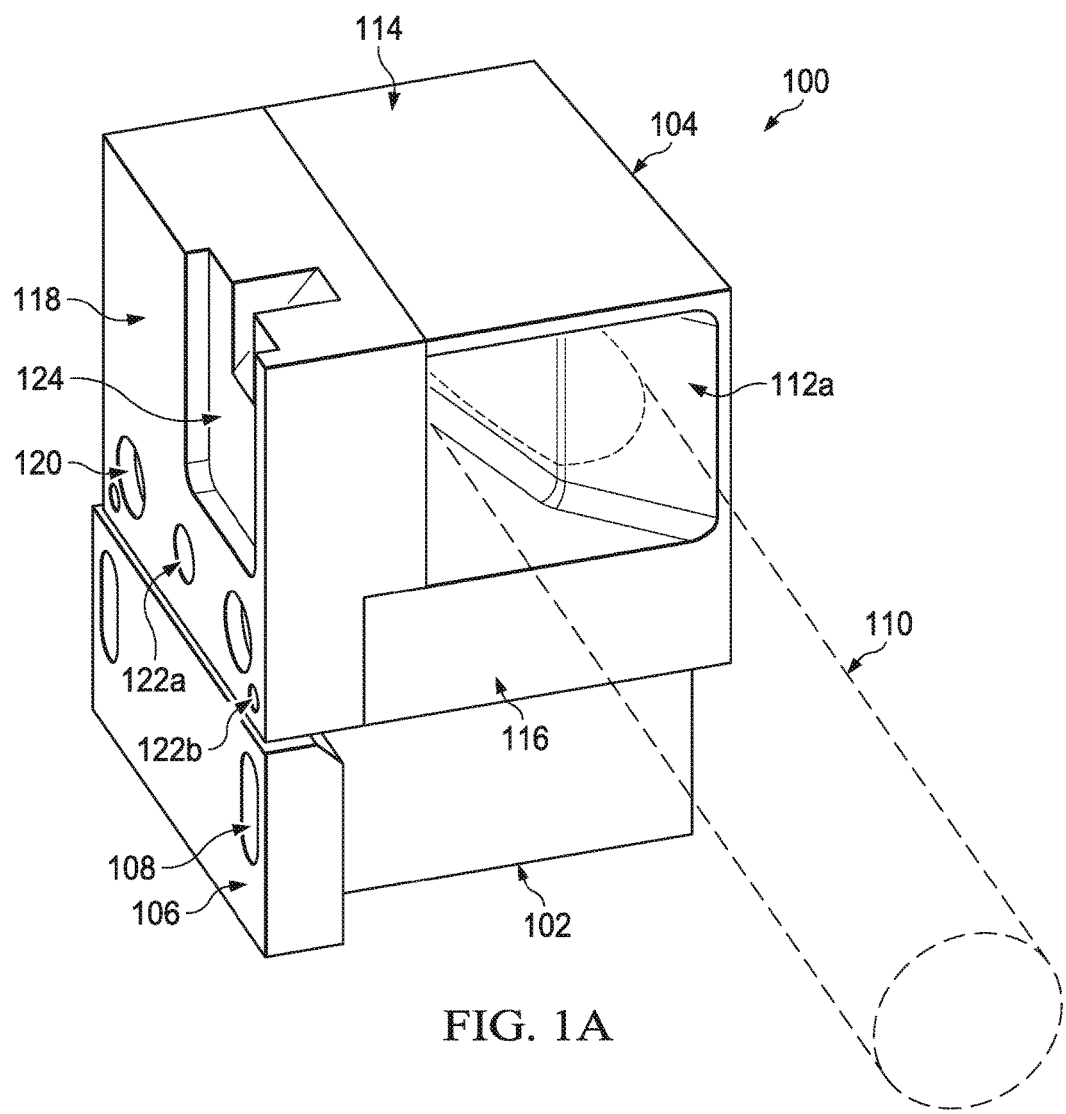
FIGS. 1A through 1D illustrate an example beam dump having an absorbing surface tailored to a beam profile in one dimension for a high-energy laser system or other system according to this disclosure.

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, a conventional laser system often includes a beam dump, which is used to convert laser energy into thermal energy in order to remove the laser energy from the laser system. Conventional beam dumps often include absorbing coatings and materials on the surfaces of the beam dumps. These absorbing coatings and materials help to absorb laser energy and convert the laser energy into thermal energy. Conventional beam dumps are often simply designed to absorb a certain amount of total laser energy.

Unfortunately, in high-energy laser systems and other systems, laser beams often do not have a uniform cross-sectional beam profile, which means the beams have a non-uniform energy distribution across their beam profiles. As a result, some areas of the beams are more intense and have larger amounts of energy compared to other areas of the beams. When such a beam strikes a conventional beam dump, certain portions of the beam dump can reach much higher temperatures than other portions of the beam dump.

Conventional beam dumps are not designed with the profiles of the incoming laser beams in mind. Rather, some conventional beam dumps are designed using coatings and materials (sometimes exotic) that can withstand the maximum temperatures that are expected to be reached. Other conventional beam dumps are designed to include expensive or complex active cooling systems or larger surface areas, such as beam dumps that use inverted cones or specialty chambers in order to spread laser energy out over a larger area. While effective in some cases, these approaches still generally increase the cost or size of the conventional beam dumps and may experience operational issues in high-energy laser systems or other systems.

This disclosure provides various beam dumps having absorbing surfaces that are tailored to the expected cross-sectional profiles of laser beams to be received by the beam dumps. As described in more detail below, an absorbing surface of a beam dump includes a surface or combination of surfaces (such as flat or curved surfaces) specifically selected and constructed for a certain beam's cross-sectional profile. The surface or surfaces operate to spread out higher-intensity portions of the beam to a greater extent using greater angles of incidence while using shallower angles of incidences for lower-intensity portions of the beam. The spreading of the higher-intensity portions of the beam could occur in a single dimension or multiple dimensions of the beam profile, and the spreading reduces the maximum temperature experienced by the beam dump.

By at least partially basing the shape of a beam dump's absorbing surface on the expected profile of a beam, it is possible to optimize the beam dump for a specific application. For example, the absorbing surface can be designed to distribute more intense portions of a specific profile beam over a larger portion of the absorbing surface, reducing the maximum temperature. It is also possible to optimize the beam dump for use with specific absorbing coatings or materials. Among other things, this may allow less complicated cooling systems to be used in the beam dump or allow "weaker" materials that can withstand lower temperatures to be used in the beam dump, which can reduce the cost of the beam dump. This may also allow for the beam dump's overall shape and size to be tailored to any volume constraints associated with a specific application or use of the beam dump.

Figure 1B:
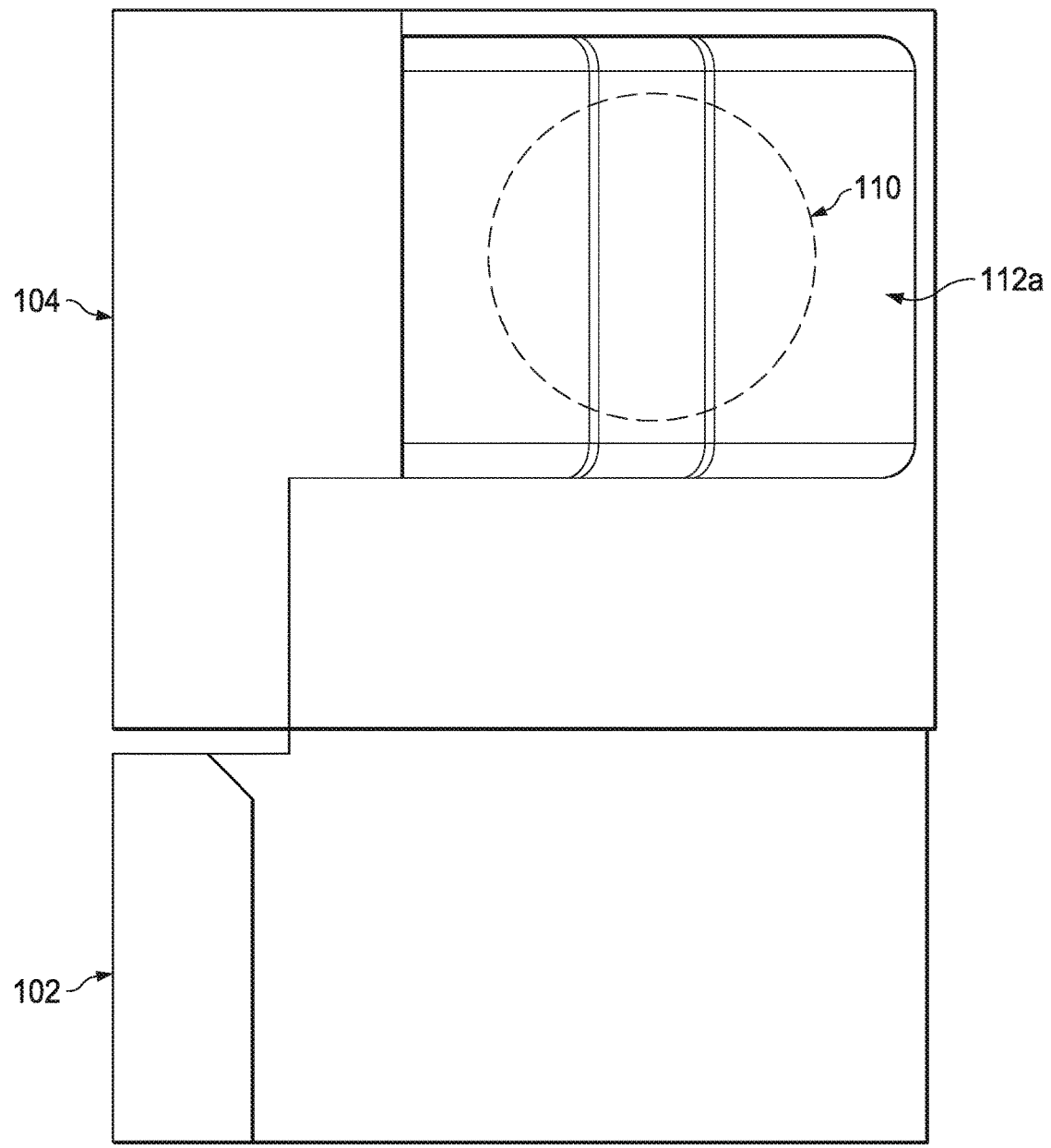
Figure 1C:
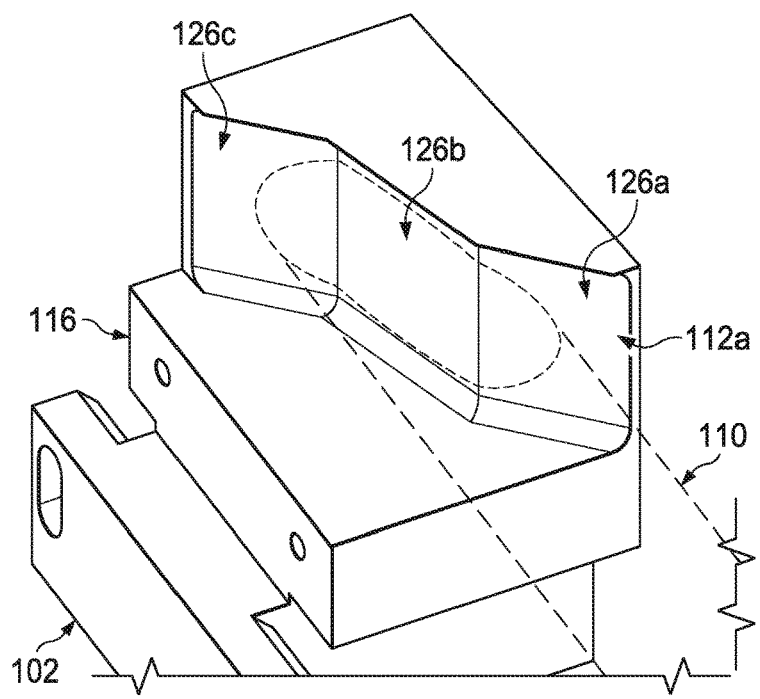

FIGS. 1A through 1D illustrate an example beam dump 100 having an absorbing surface tailored to a beam profile in one dimension for a high-energy laser system or other system according to this disclosure. As shown in FIGS. 1A through 1C, the beam dump 100 includes a base 102 and a housing 104. The base 102 generally represents a structure that enables the beam dump 100 to be secured to other components of a laser system or other system. The base 102 could have any suitable form that enables the beam dump 100 to be secured. In this example, the base 102 includes multiple flanges 106 that project outward and include holes 108. The holes 108 allow bolts or other connectors to pass through the flanges 106 and secure the base 102 (and therefore the beam dump 100) in place. However, any other suitable mechanism could be used to secure the beam dump 100.

The housing 104 generally represents a structure that receives laser energy (here in the form of a laser beam 110) and converts the laser energy into thermal energy. In this example, the housing 104 includes an absorbing surface 112a, which the beam 110 strikes. The absorbing surface 112a absorbs most or all of the energy in the beam 110, thereby terminating that laser energy and converting that laser energy into heat. While a small portion of the laser energy in the beam 110 could reflect from the absorbing surface 112a, most or all of that reflected laser energy could be absorbed by other components of the housing 104. Ideally, the housing 104 terminates all of the laser energy contained in the beam 110, although a very small amount of the laser energy contained in the beam 110 could escape the housing 104 without causing much if any damage to a larger system.

The housing 104 also includes a cover 114 positioned above the absorbing surface 112a and a bottom 116 positioned below the absorbing surface 112a, as well as a side 118 extending between the cover 114 and the bottom 116. The absorbing surface 112a, cover 114, bottom 116, and side 118 generally form a cavity into which the beam 110 enters before striking the absorbing surface 112a. Any laser energy that is not absorbed by the absorbing surface 112a and that reflects from the absorbing surface 112a could strike the cover 114, bottom 116, or side 118 and be absorbed.

In this example, the side 118 includes one or more holes 120, which can be used to allow bolts, screws, or other connectors to be used to secure the side 118 to the bottom 116 of the housing 104. Optionally, at least one injection hole 122a can be used to allow thermal paste to be injected into any gap between the side 118 and the bottom 116, and at least one witness hole 122b can be provided to allow visual inspection and confirmation that adequate thermal paste has been injected into the gap. Note, however, that the holes 122a-122b and the use of thermal paste are optional. In this example, the housing 104 further includes a slot 124, which could be used to provide clearance for other components of a larger laser system. Note that the form of the slot 124 could vary as needed or desired, or the slot 124 could be omitted if not needed. In this example, the beam dump 100 is cooled passively, such as through radiative or convective cooling. However, while not shown here, one or more inlets and one or more outlets, as well as one or more internal passageways, could be used to allow cooling fluid (such as liquid or air) to flow into and out of the beam dump 100 to provide active cooling. It should be noted that any other suitable passive or active cooling mechanisms could be used here.

The beam dump 100 could be formed from any suitable material(s) and in any suitable manner. For example, the base 102 and the housing 104 could be formed completely or primarily using aluminum, carbon, or steel, although more exotic materials could also be used. The absorbing surface 112a could be formed from the same material(s) as the housing 104, such as when the absorbing surface 112a includes surface features etched into or otherwise formed in or on the housing 104 to help absorb laser energy. The absorbing surface 112a could also be formed from different materials than the housing 104, such as when the absorbing surface 112a represents oxidized or black anodized portions of the housing 104 or one or more absorbing materials (like black chrome) deposited onto the housing 104.

The specific material or materials used to form the base 102 and the housing 104 can be based, at least in part, on the expected power of the beam 110 and the expected volume of the cavity within the housing 104. As noted above, because the absorbing surface 112a can be designed based on the expected profile of the beam 110 in order to spread out more intense portions of the beam 110, the base 102 and the housing 104 could experience less localized heating from the beam 110. This allows the base 102 and the housing 104 to be formed using less expensive materials, such as those having lower temperature damage thresholds.

The beam dump 100 could be formed as a single component or using multiple components that are coupled together in any suitable manner. For example, in some embodiments, the base 102 and the housing 104 (minus the side 118) could be formed as a single integral structure, and the side 118 could be formed separately and attached to the bottom 116 of the housing 104. In other embodiments, the base 102 and the housing 104 could be formed separately, and the housing 104 could be formed using multiple pieces that are connected together. In still other embodiments, the housing 104 could be formed as an integral structure that is attached to the base 102, or the base 102 and the housing 104 could be formed as a single integral structure. Also, each component of the beam dump 100 could be fabricated in any suitable manner, such as casting, injection molding, additive or subtractive manufacturing, or other process.

FIG. 1A illustrates a perspective view of the beam 110 entering the beam dump 100 and striking the absorbing surface 112a. FIG. 1B illustrates a side view of the beam 110 entering the beam dump 100 and striking the absorbing surface 112a. FIG. 1C illustrates a perspective view of the beam 110 entering the beam dump 100 and striking the absorbing surface 112a, but the cover 114 and side 118 have been removed.

In the example shown in FIG. 1C, the absorbing surface 112a is faceted with three distinct flat faces 126a-126c. The faces 126a and 126c generally have a smaller angle of incidence with respect to the beam 110, and the face 126b generally has a larger angle of incidence with respect to the beam 110. Each angle of incidence is defined as an angle between a line normal to a surface (any of the faces 126a-126c) and a longitudinal axis extending along the length of the beam 110.

Figure 1D:
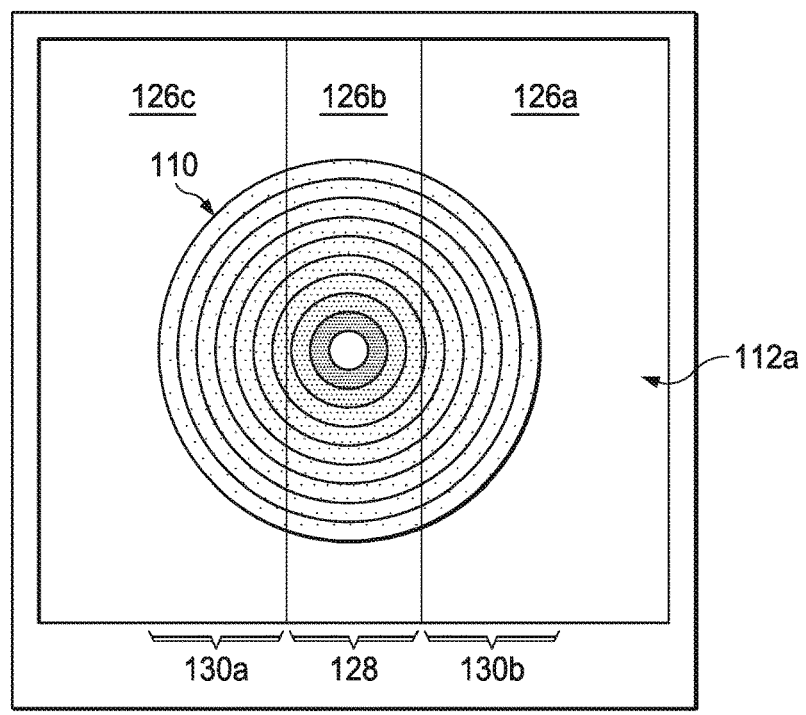

Here, it is assumed that the beam profile of the beam 110 has a Gaussian distribution, which means the intensity of the beam 110 is at a maximum at the center of the beam's cross-section and lessens moving outward from the center. This type of distribution for the beam 110 is represented in FIG. 1D using different rings, where the different rings correspond to different intensities or intensity ranges within the beam 110. The central area of the beam 110 is most intense, and each ring moving outward from the center is generally less intense.

When a beam 110 such as this strikes the absorbing surface 112a, a central portion 128 of the beam 110 strikes the absorbing surface 112a at a larger angle of incidence compared to outer portions 130a-130b of the beam 110. As a result, the central portion 128 of the beam 110 expands over the absorbing surface 112a to a larger extent than the outer portions 130a-130b of the beam 110. This is because the central portion 128 strikes the face 126b and the outer portions 130a-130b strike the faces 126a and 126c, and the face 126b has a larger angle of incidence than the faces 126a and 126c. Thus, while the face 126b may receive more energy from the beam 110, that energy is expanded over the face 126b more than the energy expands over the faces 126a and 126c. The face 126b therefore experiences less localized heating than it would if it had a smaller angle of incidence with respect to the beam 110. The faces 126a and 126c may receive less energy from the beam 110 than the face 126b, but that energy is expanded less (or not at all) compared to the face 126b.

This approach therefore helps to distribute the energy from the beam 110 more evenly across the absorbing surface 112a. Ideally, the profile of the absorbing surface 112a would match the beam profile of the beam 110 such that the energy distribution would be completely uniform over the absorbing surface 112a. In reality, a non-uniform distribution of laser energy over the absorbing surface 112a (and therefore localized heating of the absorbing surface 112a) would typically occur, but it occurs to a much smaller extent compared to conventional beam dumps.

Note that in this particular example, the design of the absorbing surface 112a is only partially optimized, and the optimization occurs in only one dimension. That is, the faces 126a-126c are arranged linearly, and the absorbing surface 112a is designed to spread out the energy in the beam 110 over a larger distance horizontally but not vertically in FIG. 1D. As a result, the energy from the beam 110 is distributed onto an area of the absorbing surface 112a that is larger horizontally than the width of the beam 110 but that is substantially the same height as the beam 110. Here, the absorbing surface 112a essentially spreads a circular beam 110 over an elliptical area of the absorbing surface 112a. Since the faces 126a-126c are generally flat in this example, the beam 110 is generally not widened vertically in FIG. 1D (although, as described below, other designs for the absorbing surface could). The design is also said to be partially optimized here since the beam 110 typically would not include only three clearly distinct areas of different intensities. Even so, given this design for the absorbing surface 112a, the higher-intensity central portion 128 of the beam 110 expands more on the absorbing surface 112a, reducing its intensity of the face 126b.

Because it is assumed here that the beam profile of the beam 110 has a Gaussian distribution, the largest angle of incidence occurs in the middle face 126b of the absorbing surface 112a. However, the beam 110 could have another distribution of energy in its cross-section, in which case the numbers of faces and the angles of incidence of those faces could vary based on the different profile. For example, if the beam 110 has a maximum intensity that is offset from its center, the face 126b would be moved to the appropriate offset location, while the sizes of the faces 126a and 126c would be adjusted accordingly. As another example, if the beam 110 has a maximum intensity on one side and the intensity gradually decreases towards the other side, the face 126a could have the largest angle of incidence, the face 126b could have a smaller angle of incidence, and the face 126c could have the smallest angle of incidence. Of course, other arrangements of the faces could also be used as needed based on the beam profile. In general, a wide variety of designs for the absorbing surface could be used, depending at least in part on (i) the actual profile that the beam 110 is expected to have, (ii) the number of dimensions to be optimized, and (iii) the amount of optimization to occur within the dimension(s).

Figure 2:
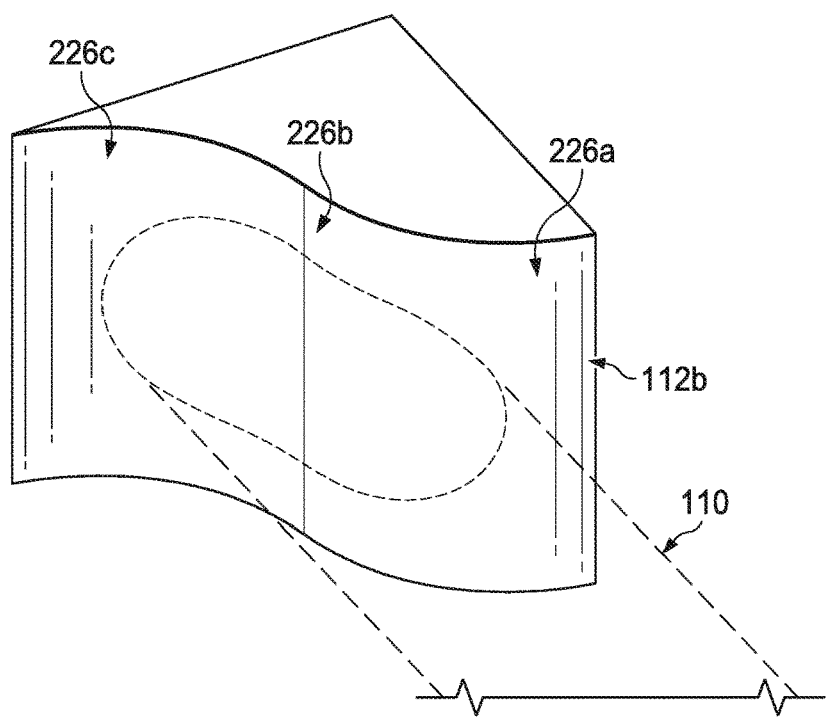
FIGS. 2 through 5 illustrate other example absorbing surfaces tailored to beam profiles in one or more dimensions for use in beam dumps according to this disclosure.

FIGS. 2 through 5 illustrate other example absorbing surfaces tailored to beam profiles in one or more dimensions for use in beam dumps according to this disclosure. As shown in FIG. 2, an absorbing surface 112b is similar to the absorbing surface 112a described above, but the absorbing surface 112b is more continuous and is not divided into distinct flat faces. Instead, the absorbing surface 112b transitions from a first portion 226a having smaller angles of incidence to a second portion 226b having larger angles of incidence and then to a third portion 226c having smaller angles of incidence. Note that the absorbing surface 112b here is curved along most or all of its length, so each portion 226a-226c does not have a single angle of incidence as with the absorbing surface 112a. The portions 226a-226c are identified here merely as a matter of convenience so that different areas of the absorbing surface 112b can be identified and discussed, without requiring each portion to have a single angle of incidence.

The different curvatures of the portions 226a-226c again can be based at least partially on the expected profile of the beam 110. In this example, the beam 110 again is assumed to have a Gaussian profile similar to that shown in FIG. 1D. Because of this, the largest angles of incidence occur in the middle of the absorbing surface 112b, and the angles of incidence decrease non-linearly going towards the ends of the absorbing surface 112b. Of course, the largest angles of incidence in the absorbing surface 112b could be moved if the beam profile of the beam 110 has a largest intensity elsewhere.

As with the absorbing surface 112a, the absorbing surface 112b here is designed to optimize the absorption of beam energy in a single dimension. This is because the portions 226a-226c are arranged linearly, and the beam 110 strikes the absorbing surface 112b in an area wider than the beam's width but about the same as the beam's height. However, the absorbing surface 112b may be more fully optimized than the absorbing surface 112a since the absorbing surface 112b uses curved surfaces rather than flat faces. These curved surfaces may more closely follow the Gaussian distribution of laser energy in the beam 110.

Figure 3:
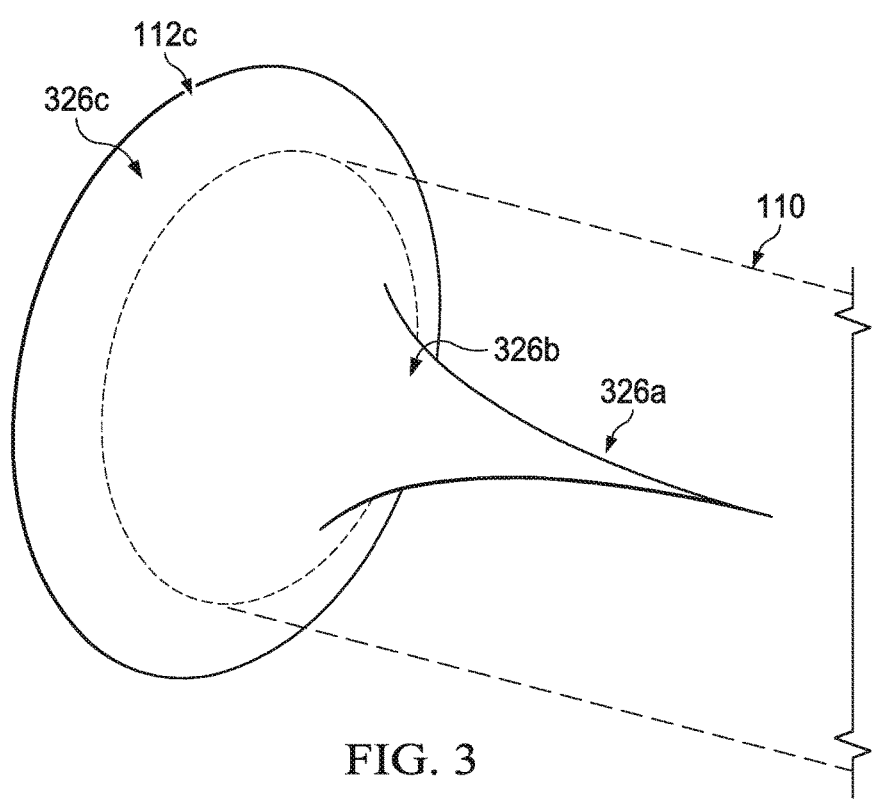

As shown in FIG. 3, an absorbing surface 112c provides optimization in multiple dimensions. Here, the absorbing surface 112c generally takes the form of an "exponential" cone, which describes a shape where the side of a cone is not a straight line rotated about an axis but rather an exponential curve rotated about an axis. The absorbing surface 112c generally transitions from a first portion 326a having the largest angles of incidence (including a tip of the exponential cone) to a second portion 326b having smaller angles of incidence and then to a third portion 326c having the smallest angles of incidence (including a base of the exponential cone). Again, the portions 326a-326c are identified here merely as a matter of convenience so that different areas of the absorbing surface 112c can be identified and discussed, without requiring each portion to have a single angle of incidence.

The optimization of energy distribution onto the absorbing surface 112c occurs in two dimensions here. This is because the absorbing surface 112c has different angles of incidence both horizontally and vertically across the absorbing surface 112c (or in whatever other orthogonal directions the dimensions are defined). The different curvatures of the portions 326a-326c again can be based at least partially on the expected profile of the beam 110. In this example, the beam 110 again has a Gaussian profile such as is shown in FIG. 1D. The largest angles of incidence occur in the middle of the absorbing surface 112c, and the angles of incidence decrease non-linearly going towards the outer edge of the absorbing surface 112c. Of course, the largest angles of incidence in the absorbing surface 112c could be moved if the beam profile of the beam 110 has a largest intensity elsewhere. For instance, if the beam 110 is most intense in a non-central location, the peak or tip of the absorbing surface 112c could be moved to and centered at that location.

Figure 4:
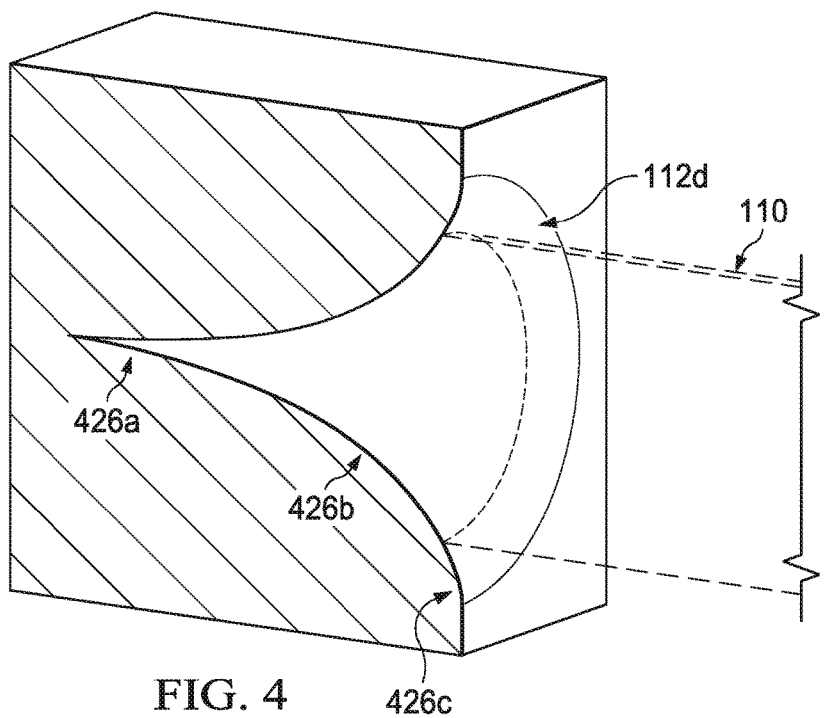

As shown in FIG. 4, an absorbing surface 112d represents an inverted form of the absorbing surface 112c. That is, rather than extending upward towards the beam 110 as in the absorbing surface 112c, the absorbing surface 112d extends downward and away from the beam 110. However, the absorbing surface 112d still generally takes the form of an exponential cone and transitions from a first portion 426a having the largest angles of incidence (including a tip of the inverted exponential cone) to a second portion 426b having smaller angles of incidence and then to a third portion 426c having the smallest angles of incidence (including a base of the inverted exponential cone).

The optimization of energy distribution onto the absorbing surface 112d again occurs in two dimensions here since the absorbing surface 112d has different angles of incidence both horizontally and vertically (or in whatever other orthogonal directions the dimensions are defined). Also, the different curvatures of the portions 426a-426c again can be based at least partially on the expected profile of the beam 110. In this example, the beam 110 has a Gaussian profile as in FIG. 1D, so the largest angles of incidence occur in the middle of the absorbing surface 112d, and the angles of incidence decrease non-linearly going towards the outer edge of the absorbing surface 112d. The largest angles of incidence in the absorbing surface 112d could be moved if the beam profile of the beam 110 has a largest intensity elsewhere, such as when the deepest point of the absorbing surface 112d is moved if the beam 110 is most intense in a non-central location.

Note that while flat faces are not used in FIGS. 3 and 4, the same approach described with respect to the absorbing surface 112a could be used with the absorbing surfaces 112c and 112d. In other words, sections of the absorbing surfaces 112c and 112d could be implemented using flat surfaces instead of curved surfaces. This would still allow for partial optimization of the beam energy distribution onto the absorbing surfaces 112c and 112d, even if the distributions are not fully optimized.

Figure 5:
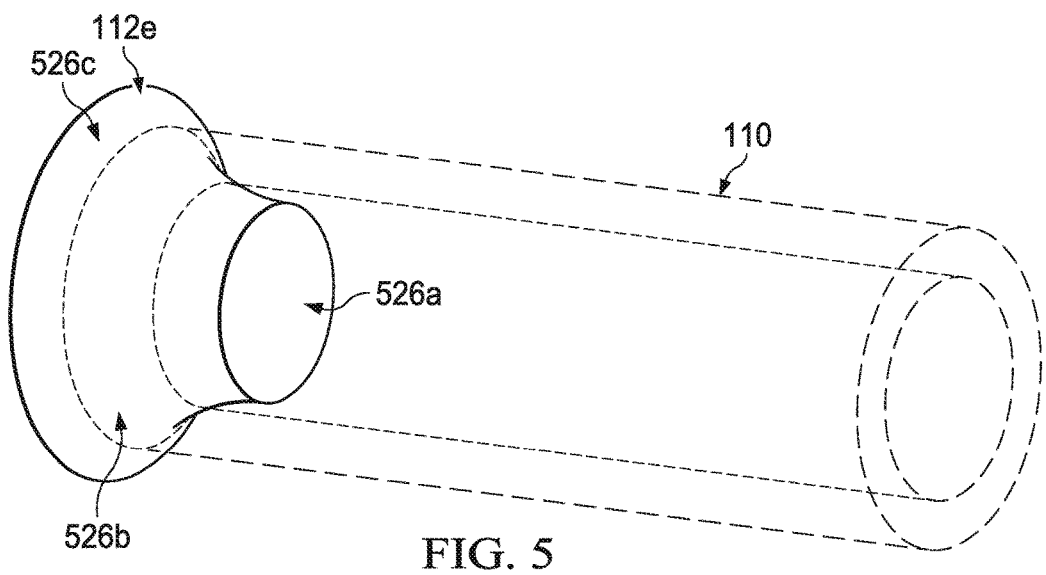

As shown in FIG. 5, an absorbing surface 112e represents a truncated exponential cone, meaning the pointed tip of an exponential cone has been removed. Here, the absorbing surface 112e transitions from a first portion 526a (including a central portion of the truncated exponential cone) to a second portion 526b having the largest angles of incidence and then to a third portion 526c having smaller angles of incidence (including a base of the truncated exponential cone). In this example, the first portion 526a is flat and perpendicular to the beam's axis. Although not shown here, an inverted form of the truncated exponential cone could also be used as an absorbing surface.

The optimization of energy distribution onto the absorbing surface 112e again occurs in two dimensions here since the absorbing surface 112e has different angles of incidence both horizontally and vertically (or in whatever other orthogonal directions the dimensions are defined). Also, the different shapes of the portions 526a-526c can be based at least partially on the expected profile of the beam 110. In this example, the beam 110 has an annular distribution of beam energy in its cross-section. The largest angles of incidence are in a ring around the middle of the absorbing surface 112e, and the angles of incidence decrease non-linearly going towards the outer edge of the absorbing surface 112e. The central portion 526a of the absorbing surface 112e is flat since it may receive little or no beam energy, although the central portion 526a of the absorbing surface 112e could have other forms if appropriate given the expected beam profile, such as a convex or concave shape (and possibly a very convex or concave shape).

Note that while a single flat face is used in FIG. 5, the same approach described with respect to the absorbing surface 112a could be used with the absorbing surface 112e. In other words, the portions 526b-526c of the absorbing surface 112e could be implemented using flat surfaces instead of curved surfaces. This would still allow for partial optimization of the beam energy distribution onto the absorbing surface 112e, even if the distributions are not fully optimized.

Despite the different shapes of the absorbing surfaces 112a-112e described above, all of the absorbing surfaces 112a-112e operate using the same general principle. Each absorbing surface 112a-112e is designed as a single surface or a combination of surfaces (flat or curved) based at least partially on the expected beam profile. At least one surface or a portion thereof is designed and positioned to spread out one or more higher-intensity portions of a beam 110. One or more lower-intensity portions of the beam 110 may or may not be spread out depending on the absorbing surface. As a result of the spreading, laser energy from the beam 110 is distributed more evenly (although not necessarily uniformly) over the absorbing surface of the beam dump 100, and the maximum temperature experienced by the beam dump 100 decreases.

Although FIGS. 1A through 1D illustrate one example of a beam dump 100 having an absorbing surface 112a tailored to a beam profile in one dimension for a high-energy laser system or other system and FIGS. 2 through 5 illustrate other examples of absorbing surfaces 112b-112e tailored to beam profiles in one or more dimensions, various changes may be made to FIGS. 1A through 5. For example, the base 102 and the housing 104 could each have any other suitable size, shape, or dimensions. Also, any suitable active or passive cooling mechanism could be used to cool the beam dump 100. In addition, the absorbing surfaces 112a-112e shown here are examples only and are based on specific types of beam profiles that may be encountered for the beam 110. However, other beam profiles are also possible, and the absorbing surfaces of the beam dump 100 could be modified in various ways to more closely match the energy distribution in a given beam 110.

FIGS. 6A through 6E illustrate example beam profiles based on which absorbing surfaces of beam dumps could be tailored according to this disclosure. In particular, FIGS. 6A through 6E plot beam intensities within a cross-section of a beam 110 for different types of beam profiles. Each of these beam profiles could represent the profile of the beam 110 being used with the beam dump 100 described above. Note that this is not a complete illustration of all possible beam profiles and is meant merely to illustrate examples of the types of beam profiles that could be used to tailor an absorbing surface of a beam dump.

Figure 6A:
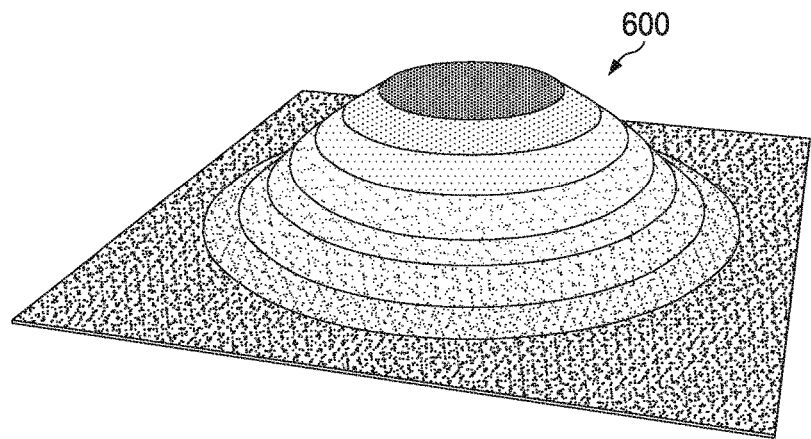
FIGS. 6A through 6E illustrate example beam profiles based on which absorbing surfaces of beam dumps could be tailored according to this disclosure.

In FIG. 6A, a beam profile 600 represents a Gaussian distribution of energy within a beam's cross-section. As described above, in a Gaussian distribution, the intensity of the beam 110 is at a maximum at the center of the beam's cross-section and lessens moving outward from the beam's center. The absorbing surfaces 112a-112b can be used with this beam profile 600 to optimize the distribution of energy onto the beam dump 100 in one dimension. Alternatively, the absorbing surfaces 112c-112d can be used with this beam profile 600 to optimize the distribution of energy onto the beam dump 100 in two dimensions, or the absorbing surface 112e could be modified so that the central portion 526a is convex or concave.

Figure 6B:
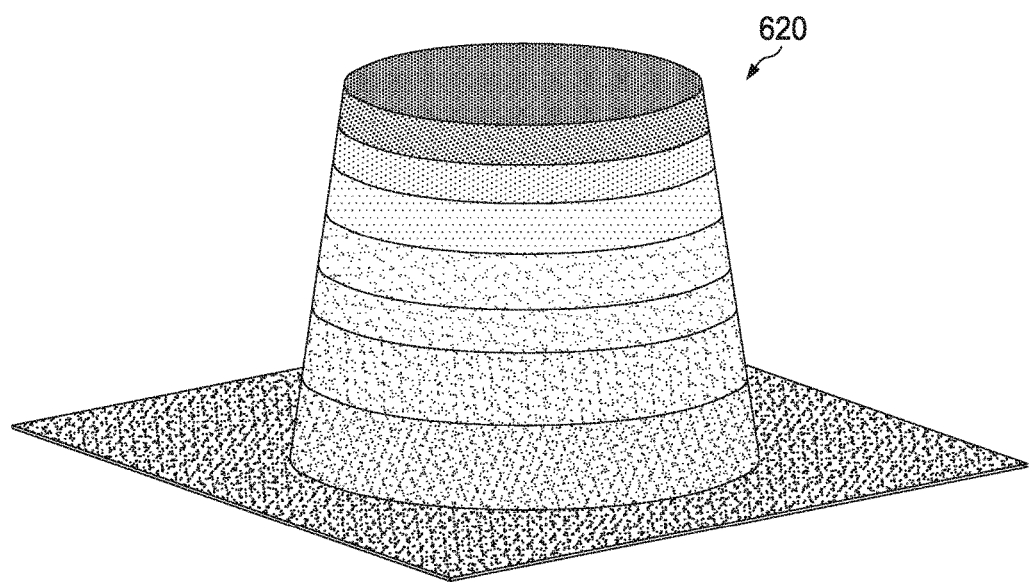

In FIG. 6B, a beam profile 620 represents a "mesa" or flat-top distribution of energy within a beam's cross-section. Unlike the Gaussian distribution in the beam profile 600 where only the very center of the profile 600 reaches a maximum value, the beam profile 620 indicates that a much larger area of the profile 620 reaches a maximum value. Also, the profile 620 ramps much more quickly from its outer edge to the maximum value. A beam 110 having this type of profile 620 would not have the large number of intensity rings as shown in FIG. 1D and would instead have a more uniform energy distribution in a larger portion of the beam's cross-section. The same types of absorbing surfaces 112a-112d could be used with the beam profile 620, but the central portions of the absorbing surfaces 112a-112d would be enlarged and the outer portions of the absorbing surfaces 112a-112d would be narrowed to accommodate the larger high-intensity area of the beam profile 620. The absorbing surface 112e could also be modified so that the central portion 526a is larger and either convex or concave.

Figure 6C:
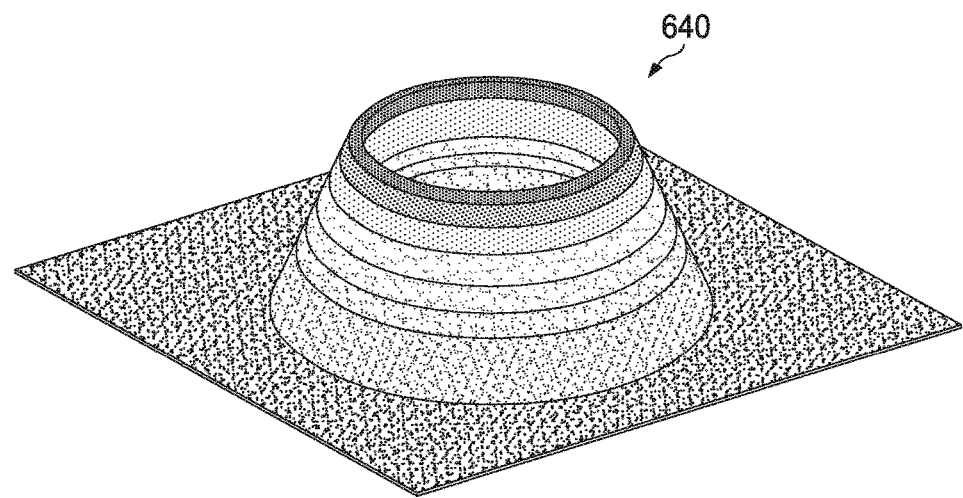

In FIG. 6C, a beam profile 640 represents an annular distribution of energy within a beam's cross-section and could represent the annular beam 110 shown in FIG. 5. In this type of beam profile 640, beam energy is concentrated within a single ring around a center of the profile 640, and much less energy is contained outside the ring and inside the ring. The absorbing surfaces 112a-112b could be used with this type of beam profile 640 to optimize the distribution of energy onto the beam dump 100 in one dimension, or the absorbing surface 112e could be used with this beam profile 640 to optimize the distribution of energy onto the beam dump 100 in two dimensions. Alternatively, one instance of the absorbing surface 112c or 112d could be designed, positioned at a distance from a vertical axis, and rotated around the vertical axis to form a circular ridge or valley that follows the same pattern as the profile 640. This would allow the highest or lowest points of the absorbing surface 112c or 112d to follow the ring of the beam profile 640.

Figure 6D:
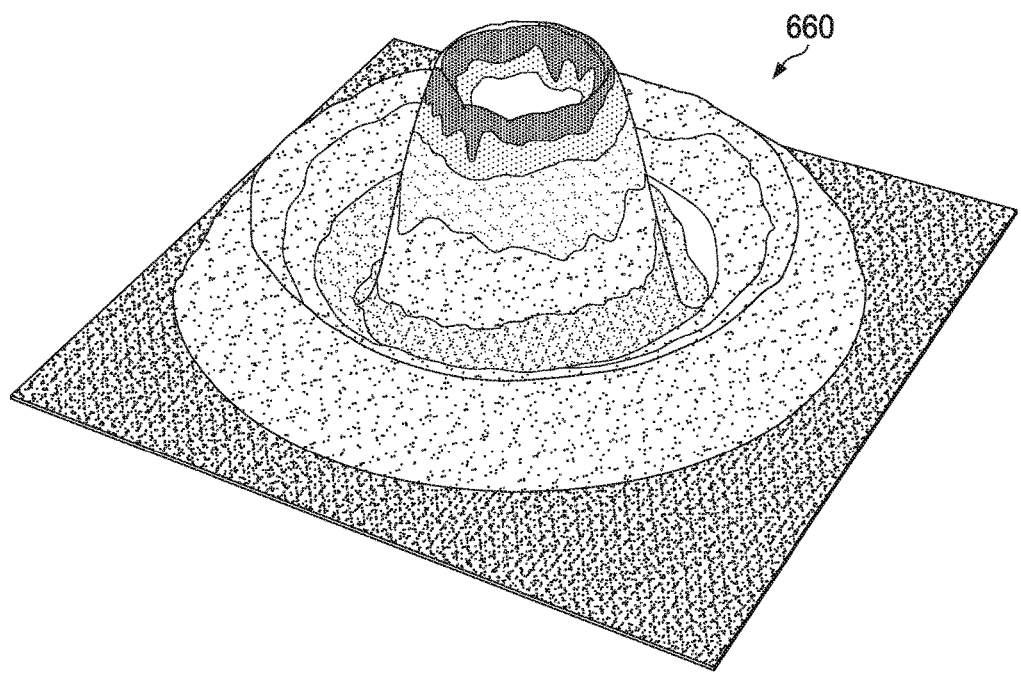

In FIG. 6D, a beam profile 660 represents a Laguerre-Gaussian distribution of energy within a beam's cross-section. Here, the Laguerre-Gaussian distribution includes an outer ring of higher intensity and an inner ring of higher intensity. Note that the relative heights of the two rings could vary, and the outer ring may or may not be higher in intensity than the inner ring. The absorbing surfaces 112a-112b could be used with this type of beam profile 660 by increasing the number of areas with larger angles of incidence and by increasing the number of areas with smaller angles of incidence. Along one dimension, the areas with larger angles of incidence would be positioned to receive laser energy contained in the inner and outer rings of the beam 110, and the areas with smaller angles of incidence would be positioned to receive laser energy in other portions of the beam 110. For two-dimensional optimization, two instances of the absorbing surface 112c or 112d could be designed, positioned at different distances from a vertical axis, and rotated around the vertical axis to form multiple circular ridges or valleys that follow the same pattern as the profile 660. This would allow the highest or lowest points of the two absorbing surfaces 112c or 112d to follow the inner and outer rings of the beam profile 660. Alternatively, the absorbing surface 112e could be used with the inner ring of higher intensity in the beam profile 660, and a raised ring (or one instance of the absorbing surface 112c or 112d rotated around a vertical axis) could be used with the outer ring of higher intensity in the beam profile 660.

Figure 6E:
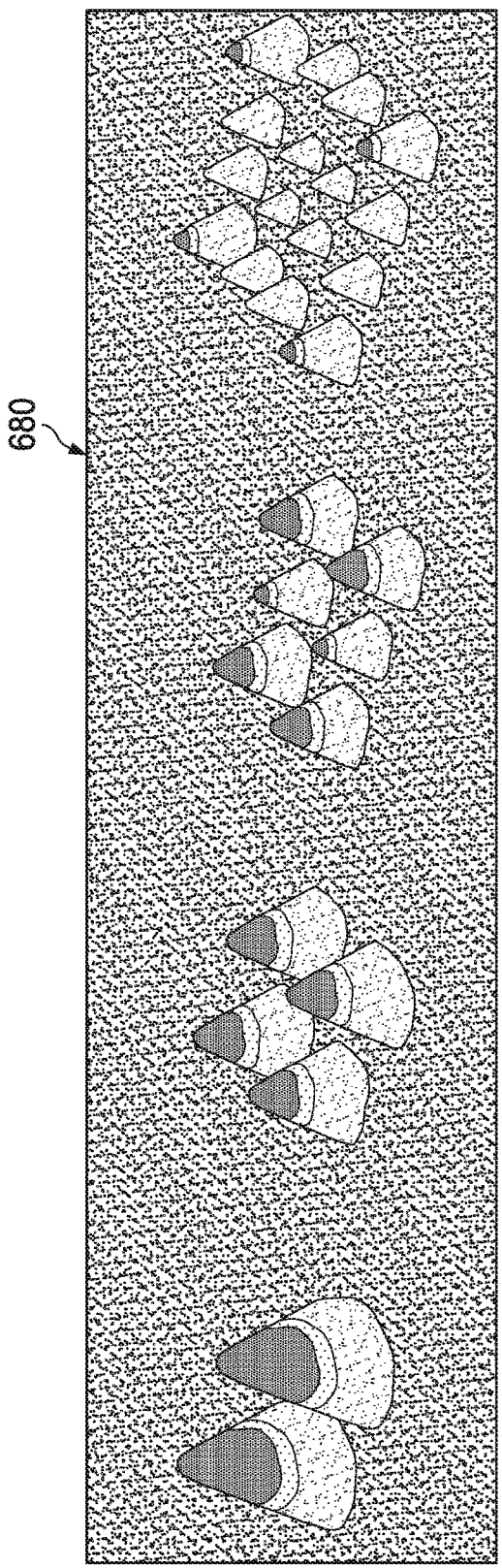

In FIG. 6E, various beam profiles 680 represent different example Hermite-Gaussian distributions of energy within a beam's cross-section. Here, the Hermite-Gaussian distributions include different numbers of smaller peaks of higher intensity, and the number of peaks and the arrangement of those peaks vary in different Hermite-Gaussian distributions. The absorbing surfaces 112a-112b could be used with any of these beam profiles 680 by increasing the number of areas with larger angles of incidence and by increasing the number of areas with smaller angles of incidence. The areas with larger angles of incidence would be positioned to receive laser energy in the peaks of the beam profiles 680, and the areas with smaller angles of incidence would be positioned to receive laser energy in other portions of the beam profiles 680. The sizes of the areas with larger angles of incidence can vary since the sizes of the peaks in the different beam profiles 680 can also vary. For two-dimensional optimization, the absorbing surface 112c or 112d could be replicated and positioned to receive the peaks in the beam profiles 680. The sizes of the replicated absorbing surfaces 112c or 112d can vary since the sizes of the peaks in the beam profiles 680 can also vary.

Although FIGS. 6A through 6E illustrate examples of beam profiles based on which absorbing surfaces of beam dumps could be tailored, various changes may be made to FIGS. 6A through 6E. For example, Gaussian, mesa, annular, Laguerre-Gaussian, and Hermite-Gaussian distributions could vary and need not have the exact forms shown in FIGS. 6A through 6E. Also, laser beams could have other distributions not shown here, and absorbing surfaces of beam dumps could be tailored as needed to those other distributions. In addition, the above description has presented example ways in which the absorbing surfaces 112a-112e could be tailored for use with the beam profiles shown in FIGS. 6A through 6E. This is for illustration and explanation only. Any other suitable absorbing surfaces could be used with the beam profiles shown in FIGS. 6A through 6E or other beam profiles.

FIGS. 7A and 7B illustrate example results that could be obtained using a beam dump having an absorbing surface tailored to a beam profile for a high-energy laser system or other system according to this disclosure. In particular, FIG. 7A illustrates an example temperature distribution 700 in a cross-section of a beam dump that receives laser energy having a Gaussian distribution (the beam profile 600), where an absorbing surface of the beam dump is a simple inverted straight cone. FIG. 7B illustrates an example temperature distribution 750 in a beam dump 100 that receives the same laser energy, but the beam dump 100 includes the absorbing surface 112a. Both beam dumps are formed using the same materials and absorptive coatings.

As shown in FIG. 7A, because the absorbing surface of the beam dump is a simple inverted cone, the absorbing surface narrows from a larger end 702 to a tip 704. Given the Gaussian distribution of the laser energy in the beam, the bulk of the laser energy is absorbed at or near the tip 704 of the inverted cone. As a result, the temperature distribution 700 shows that the tip 704 of the absorbing surface experiences much higher temperatures than other portions of the absorbing surface. In some simulations, the maximum temperature experienced by this absorbing surface occurs at the very end of the tip 704 and could reach a temperature of about 365° C. Also, in some simulations, the total temperature range experienced by the entire absorbing surface here could range from about 110° C. to about 365° C.

As shown in FIG. 7B, because the absorbing surface 112a of the beam dump 100 is tailored more to the beam profile 600, the temperature distribution 750 of the absorbing surface 112a is spread out much more compared to the temperature distribution 700. While there is still a "hot spot" in the temperature distribution 750, the hot spot is spread out over a much larger area of the absorbing surface 112a. In some simulations, the maximum temperature experienced by the absorbing surface 112a could reach a temperature of about 115° C., and the total temperature range experienced by the entire absorbing surface 112a could range from about 70° C. to about 115° C. This is significantly lower than the maximum temperature and temperature range in the temperature distribution 700, and it is achieved using the same materials and absorptive coatings. As can be seen here, while not obtaining a uniform temperature distribution, the beam dump 100 is able to obtain a temperature distribution 750 that is much more even compared to the temperature distribution 700. More even energy distribution could be obtained by using the absorbing surface 112b or by performing two-dimensional distribution as described above.

Although FIGS. 7A and 7B illustrate examples of results that could be obtained using a beam dump having an absorbing surface tailored to a beam profile for a high-energy laser system or other system, various changes may be made to FIGS. 7A and 7B. For example, the temperature distributions 700 and 750 shown here are examples based on specific simulations. Actual implementations of a beam dump having an inverted straight cone and actual implementations of the beam dump 100 could experience other temperature distributions. Also, other temperature distributions could be obtained in the beam dump 100 using other absorbing surfaces, such as those described above.

Figure 8:
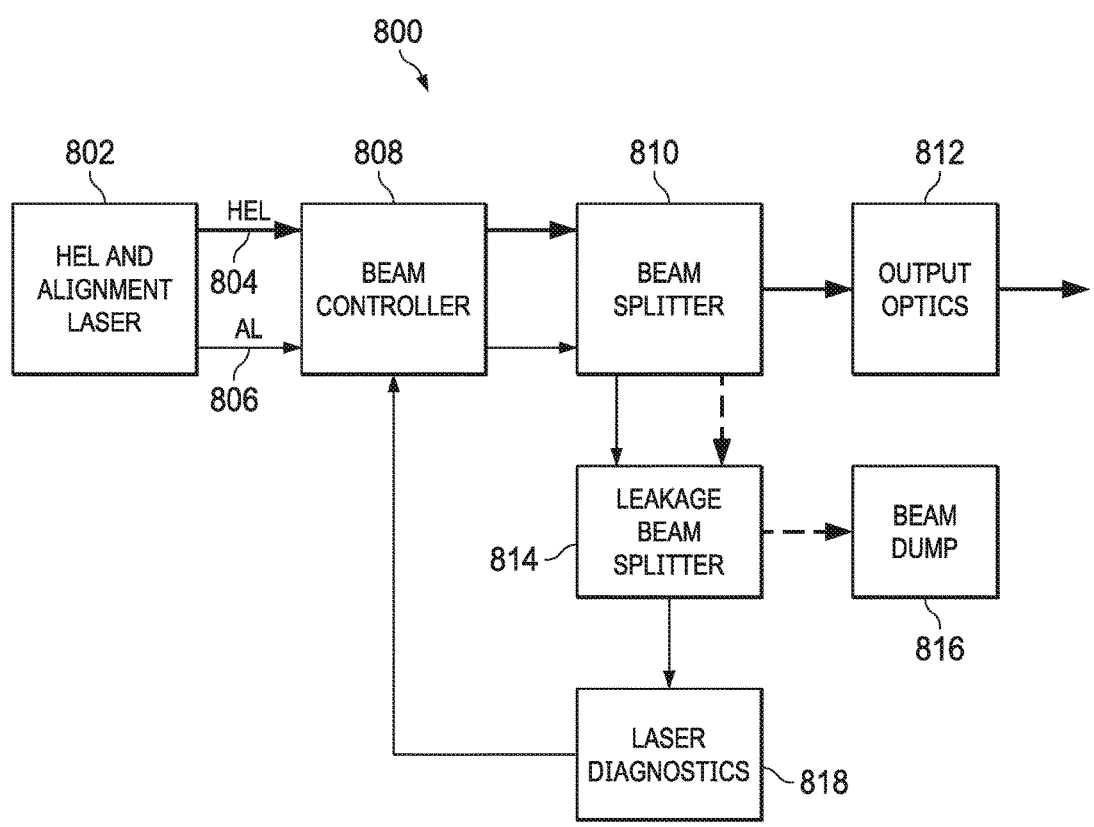
FIG. 8 illustrates an example high-energy laser system according to this disclosure.

FIG. 8 illustrates an example high-energy laser system 800 according to this disclosure. As shown in FIG. 8, the system 800 includes multiple lasers 802, including a high-energy laser (HEL) and an alignment laser. The high-energy laser generally operates to produce a high-energy laser beam 804, which is output from the system 800. The alignment laser generally operates to produce a much lower-energy alignment beam 806, which is used to control the alignment of the high-energy beam 804 with other components of the system 800. Each laser 802 could be implemented in any suitable manner. In some embodiments, the high-energy laser is implemented using a master-oscillator source that generates a low-energy beam and a power amplifier (such as a planar waveguide) that amplifies the low-energy beam and generates the high-energy beam 804.

A beam controller 808 operates to reposition or otherwise prepare the high-energy beam 804 for output from the system 800. A beam splitter 810 allows the bulk of the high-energy beam 804 to pass through the beam splitter 810 to output optics 812, while the beam splitter 810 reflects the alignment beam 806. The output optics 812 focus the high-energy beam 804 or otherwise relay the high-energy beam 804 out of the system 800. The beam controller 808 includes any suitable structure for modifying a high-energy beam. The beam splitter 810 includes any suitable structure(s) for splitting optical signals. The output optics 812 include any suitable optical device(s) for directing or formatting optical signals.

Ideally, the beam splitter 810 would pass all laser energy in the high-energy beam 804 to the output optics 812. In reality, however, some energy in the high-energy beam 804 reflects from the beam splitter 810 and continues to travel with the alignment beam 806. This residual or leakage energy from the high-energy beam 804 needs to be terminated, or it could damage other components of the laser system 800. Here, a leakage beam splitter 814 reflects most or all of the residual HEL energy to a beam dump 816 and passes the alignment beam 806 to a laser diagnostics unit 818. The beam dump 816 includes an absorbing surface tailored to the profile of the incoming residual energy (which matches or closely resembles the beam profile of the high-energy beam 804) and terminates all or substantially all of the residual energy. The beam splitter 814 includes any suitable structure(s) for splitting optical signals. The beam dump 816 could represent the beam dump 100 described above, although the exact form of the beam dump 816 could vary as needed or desired.

The laser diagnostics unit 818 generally operates to analyze the alignment beam 806 and make changes to the beam controller 808. This may allow, for example, the laser diagnostics unit 818 to change how the beam controller 808 is directing the high-energy beam 804. The diagnostics unit 818 includes any suitable structure for analyzing data and making adjustments to a high-energy laser beam.

Although FIG. 8 illustrates one example of a high-energy laser system 800, various changes may be made to FIG. 8. For example, while the system 800 represents one example use of a beam dump having an absorbing surface tailored to a beam profile, such beam dumps could be used in any other suitable system. Also, while the beam dump 816 is shown here as terminating residual energy from a high-energy beam 804, a beam dump having an absorbing surface tailored to a beam profile could be used to terminate any other suitable laser energy.

Figure 9:
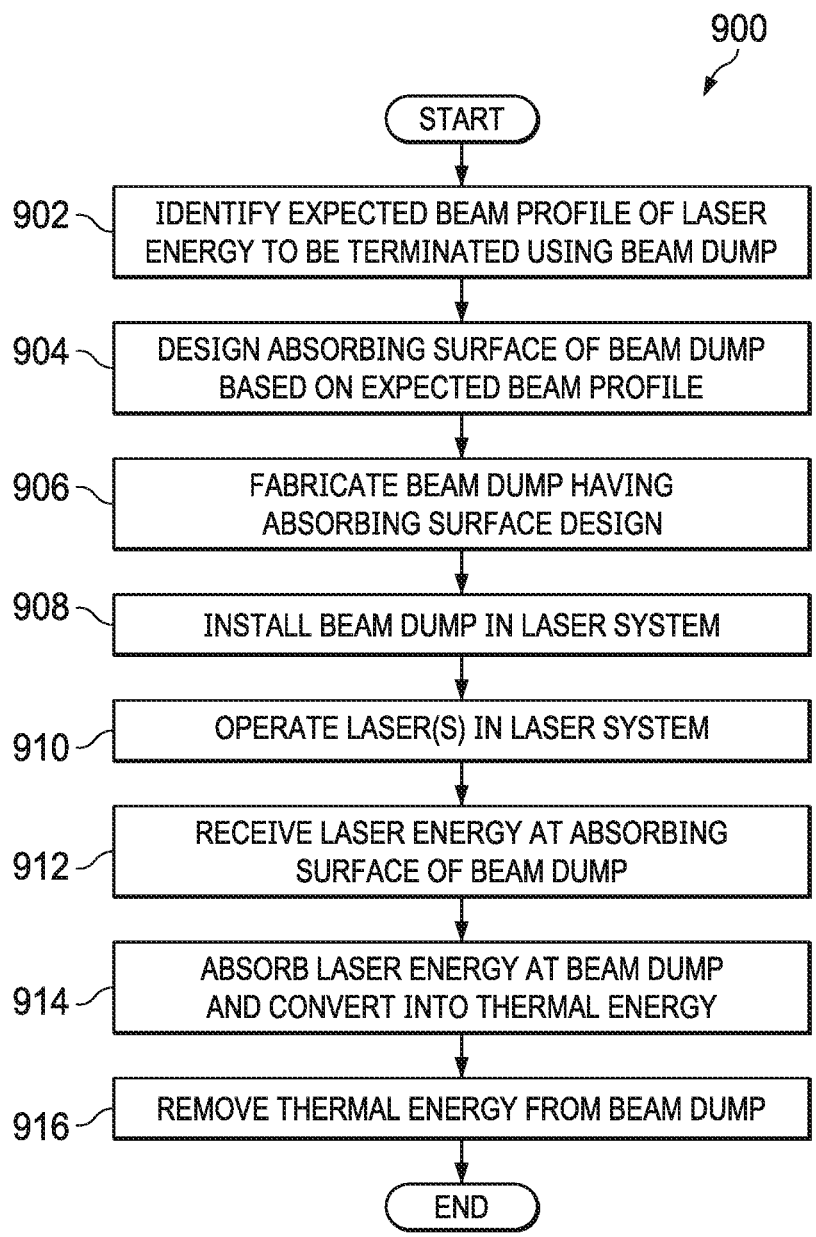
FIG. 9 illustrates an example method for fabricating and using a beam dump having an absorbing surface tailored to a beam profile in one or more dimensions for a high-energy laser system or other system according to this disclosure.

FIG. 9 illustrates an example method 900 for fabricating and using a beam dump having an absorbing surface tailored to a beam profile in one or more dimensions for a high-energy laser system or other system according to this disclosure. For ease of explanation, the method 900 is described as involving the beam dump 100 having an absorbing surface 112a-112e being used as the beam dump 816 in the system 800 of FIG. 8. However, the method 900 could involve any suitable beam dump having any suitable tailored absorbing surface, and the beam dump could be used in any suitable system.

As shown in FIG. 9, an expected profile of beam energy to be terminated by a beam dump is identified at step 902. This could include, for example, using equipment to measure the actual intensities of a beam profile for a laser beam or running simulations to identify the expected intensities of a beam profile for a laser beam. In some embodiments, the expected profile could be a Gaussian, mesa, annular, Laguerre-Gaussian, or Hermite-Gaussian distribution, although other beam profiles could also be identified.

A design for an absorbing surface of a beam dump is identified based on the expected beam profile at step 904. This could include, for example, designing an absorbing surface so that one or more portions of the absorbing surface would have one or more larger angles of incidence with respect to the beam energy in more intense portions of the beam profile. This could also include designing the absorbing surface so that one or more portions of the absorbing surface would have one or more smaller angles of incidence (possibly a zero angle of incidence) with respect to the beam energy in less intense portions of the beam profile. The portions with the different angles of incidence could be arranged along a single dimension or in multiple dimensions.

A beam dump having the designed absorbing surface is fabricated at step 906. This could include, for example, fabricating the beam dump 100 with the desired design for the absorbing surface within a cavity defined by the housing 104 of the beam dump 100. Various manufacturing techniques for fabricating the beam dump 100 (either integrally or as separate connected components) are provided above. The beam dump is installed in a laser system at step 908. This could include, for example, attaching the base 102 of the beam dump 100 to a larger structure.

At this point, one or more lasers can be operated in the laser system at step 910, and laser energy is received at the absorbing surface of the beam dump at step 912. This could include, for example, operating the lasers 802 and other components of the laser system 800 and receiving residual laser energy at the beam dump. The received laser energy is absorbed at the beam dump and converted into thermal energy at step 914, and the thermal energy is removed from the beam dump at step 916. This could include, for example, the absorbing surface of the beam dump absorbing most or all of the incoming laser energy. Any laser energy reflected from the absorbing surface is ideally absorbed by other components of the beam dump. This could also include using passive or active cooling to remove the thermal energy from the absorbing surface.

Although FIG. 9 illustrates one example of a method 900 for fabricating and using a beam dump having an absorbing surface tailored to a beam profile in one or more dimensions for a high-energy laser system or other system, various changes may be made to FIG. 9. For example, while shown as a series of steps, various steps in FIG. 9 could overlap, occur in parallel, occur in a different order, or occur any number of times. Also, different entities could perform different steps of FIG. 9, such as when different entities design, fabricate, install, and use the beam dump. Thus, for instance, steps 902-908 could be performed separately from steps 910-916 (although other subdivisions of the steps could also be used).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a housing that defines a cavity configured to receive laser energy; and
   an absorbing surface within the cavity, the absorbing surface configured to absorb the laser energy and convert the laser energy into thermal energy;
   wherein a shape of the absorbing surface is based on a profile of the laser energy such that:
      at least one first portion of the absorbing surface has one or more first angles of incidence with respect to the laser energy and is configured to receive at least one first portion of the laser energy; and
      at least one second portion of the absorbing surface has one or more second angles of incidence with respect to the laser energy and is configured to receive at least one second portion of the laser energy;
   wherein the one or more first angles of incidence are larger than the one or more second angles of incidence; and
   wherein the at least one first portion of the laser energy is more intense than the at least one second portion of the laser energy.

2. The apparatus of claim 1, wherein the absorbing surface is configured such that the at least one first portion of the laser energy expands over the at least one first portion of the absorbing surface to a greater extent than the at least one second portion of the laser energy expands over the at least one second portion of the absorbing surface.

3. The apparatus of claim 1, wherein the absorbing surface is configured to expand the at least one first portion of the laser energy in a single dimension.

4. The apparatus of claim 3, wherein:
   the at least one first portion of the absorbing surface comprises one or more first flat faces;
   the at least one second portion of the absorbing surface comprises one or more second flat faces; and
   the first and second flat faces are arranged linearly.

5. The apparatus of claim 3, wherein:
   the at least one first portion of the absorbing surface comprises one or more first curved surfaces;
   the at least one second portion of the absorbing surface comprises one or more second curved surfaces; and
   the first and second curved surfaces are arranged linearly.

6. The apparatus of claim 1, wherein the absorbing surface is configured to expand the at least one first portion of the laser energy in multiple dimensions.

7. The apparatus of claim 6, wherein:
   the shape of the absorbing surface comprises an exponential cone;
   the at least one first portion of the absorbing surface comprises a tip of the exponential cone; and
   the at least one second portion of the absorbing surface comprises a base of the exponential cone.

8. The apparatus of claim 6, wherein:
   the shape of the absorbing surface comprises a truncated exponential cone;
   the at least one second portion of the absorbing surface comprises a central portion of the truncated exponential cone and a base of the truncated exponential cone; and
   the at least one first portion of the absorbing surface comprises a surface between the central portion of the truncated exponential cone and the base of the truncated exponential cone.

9. The apparatus of claim 1, wherein the shape of the absorbing surface is based on the laser energy having a cross-sectional distribution of energy that is one of: a Gaussian distribution, a flat-top distribution, an annular distribution, a Laguerre-Gaussian distribution, or a Hermite-Gaussian distribution.

10. The apparatus of claim 1, wherein the housing is configured to absorb additional laser energy that reflects from and is not absorbed by the absorbing surface.

11. An apparatus comprising:
   a housing that defines a cavity configured to receive laser energy; and
   an absorbing surface within the cavity, the absorbing surface configured to absorb the laser energy and convert the laser energy into thermal energy;
   wherein:
      a first portion of the absorbing surface has one or more first angles of incidence with respect to the laser energy and is configured to receive at least one first portion of the laser energy;
      second and third portions of the absorbing surface respectively have one or more second angles of incidence and one or more third angles of incidence with respect to the laser energy and are configured to respectively receive at least one second portion of the laser energy and at least one third portion of the laser energy;
      the first, second, and third portions of the absorbing surface are arranged linearly such that the first portion of the absorbing surface is located between the second and third portions of the absorbing surface;
      the one or more first angles of incidence are larger than the one or more second angles of incidence and the one or more third angles of incidence; and
      the at least one first portion of the laser energy is more intense than the second and third portions of the laser energy.

12. The apparatus of claim 11, wherein the absorbing surface is configured such that the at least one first portion of the laser energy expands over the first portion of the absorbing surface to a greater extent than the second and third portions of the laser energy expand over the second and third portions of the absorbing surface.

13. The apparatus of claim 11, wherein each portion of the absorbing surface comprises a flat face.

14. The apparatus of claim 11, wherein each portion of the absorbing surface comprises a curved surface.

15. An apparatus comprising:
a housing that defines a cavity configured to receive laser energy; and
an absorbing surface within the cavity, the absorbing surface configured to absorb the laser energy and convert the laser energy into thermal energy;
wherein:
a shape of the absorbing surface comprises an exponential cone;
a first portion of the absorbing surface comprises a tip of the exponential cone, the first portion having one or more first angles of incidence with respect to the laser energy and being configured to receive a first portion of the laser energy;
a second portion of the absorbing surface comprises a base of the exponential cone, the second portion having one or more second angles of incidence with respect to the laser energy and being configured to receive a second portion of the laser energy;
the one or more first angles of incidence are larger than the one or more second angles of incidence; and
the first portion of the laser energy is more intense than the second portion of the laser energy.

16. The apparatus of claim 15, wherein the absorbing surface is configured such that the first portion of the laser energy expands over the first portion of the absorbing surface to a greater extent than the second portion of the laser energy expands over the second portion of the absorbing surface.

17. The apparatus of claim 15, wherein:
a third portion of the absorbing surface is positioned between the base and the tip of the exponential cone; and
the third portion of the absorbing surface has one or more third angles of incidence smaller than the one or more first angles of incidence and larger than the one or more second angles of incidence.

18. The apparatus of claim 15, wherein the exponential cone comprises an inverted exponential cone.

19. An apparatus comprising:
a housing that defines a cavity configured to receive laser energy; and
an absorbing surface within the cavity, the absorbing surface configured to absorb the laser energy and convert the laser energy into thermal energy;
wherein:
a shape of the absorbing surface comprises a truncated exponential cone;
a first portion of the absorbing surface comprises a central portion of the truncated exponential cone;
a second portion of the absorbing surface comprises a base of the truncated exponential cone;
a third portion of the absorbing surface comprises a surface between the central portion of the truncated exponential cone and the base of the truncated exponential cone;
the first and second portions of the absorbing surface respectively have one or more first angles of incidence and one or more second angles of incidence with respect to the laser energy and are configured to respectively receive at least one first portion of the laser energy and at least one second portion of the laser energy;
the third portion of the absorbing surface has one or more third angles of incidence with respect to the laser energy and is configured to receive at least one third portion of the laser energy;
the one or more third angles of incidence are larger than the one or more first angles of incidence and the one or more second angles of incidence; and
the at least one third portion of the laser energy is more intense than the first and second portions of the laser energy.

20. The apparatus of claim 19, wherein the first portion of the absorbing surface is flat.

* * * * *